C. F. LENHART.
DIE.
APPLICATION FILED MAR. 14, 1919.
1,380,984.
Patented June 7, 1921.
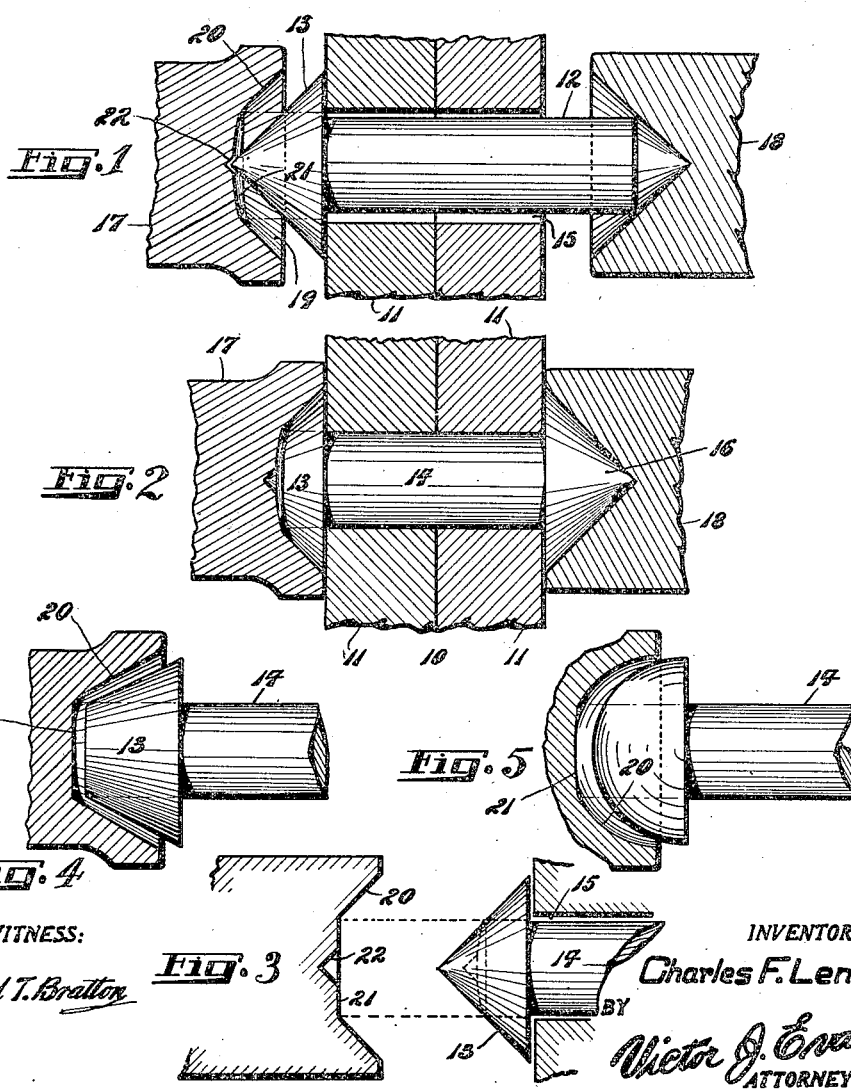
WITNESS:
Alfred T. Bratton
INVENTOR.
Charles F. Lenhart
BY
Victor J. Evans
ATTORNEY.

UNITED STATES PATENT OFFICE.

CHARLES F. LENHART, OF PHILADELPHIA, PENNSYLVANIA.

DIE.

1,380,984. Specification of Letters Patent. Patented June 7, 1921.

Application filed March 14, 1919. Serial No. 282,529.

*To all whom it may concern:*

Be it known that I, CHARLES F. LENHART, a citizen of the United States, residing at 5239 Upland street, Philadelphia, in the county of Philadelphia and State of Pennsylvania, have invented new and useful Improvements in Dies, of which the following is a specification.

The invention relates to riveting, and has for an object to provide a die construction whereby the maximum efficiency of a rivet as to the piece of work to which it is applied, will be obtained, and the application of the rivet to the piece of work will be directed in a manner which will insure a positive upsetting of the rivet throughout the entire length of its stem or shank.

Among other features the invention comprehends a particular form of die construction for use on an end of the rivet in conjunction with the usual pressure or hammer blow exerted on the other end of the rivet, so as to cause the shank of the rivet to be completely upset in the hole of the piece of work to be riveted and thereby entirely fill up the hole, and to this end the particular form of die construction and its application to the rivet, comprehends the production of a pressure exerted against the manufactured head end of the rivet, which will be the end of the rivet opposite to the end to which the primary pressure is applied, so that the resultant pressure will be directed along a particular line or plane longitudinally of the shank and in a direction calculated to lie between the periphery of the shank and the border wall of the hole so that the complete upsetting of the rivet in the hole will be accomplished.

I am fully aware of the fact that in riveting, the application of the usual pressure means or hammer to the projecting shank end of a rivet not only forms a head thereon, but also upsets that end of the rivet in the hole, and I have found in practice that the degree of heat of the rivet in its application to a piece of work has a great deal to do with the upsetting of the shank of the rivet in the hole. I have also found however, that in practice, even with a rivet that has been heated to the required degree, the upsetting of the shank of the rivet when the usual pressure is applied to the stem or shank end thereof to form a head thereon, is not of the nature which insures an absolute and positive upsetting of the shank throughout its length in the hole.

I have found that by operating in a distinctive manner upon the manufactured head end of the rivet or on what may also be termed the bucked-up side or end of the rivet, that the application of pressure along a particular line of direction to the end that this pressure will materialize along the stem or shank of the rivet with relation to the bordering wall of the hole, will insure an upsetting of the shank of the rivet, particularly at that end of the rivet having the manufactured head, so that whereas the usual pressure ordinarily applied to the stem or shank end of the rivet for the formation of the head thereon, will undoubtedly upset a portion of the shank of the rivet in the hole and at that end of the shank of the rivet where the operation is directed, the application of a particular line of pressure through the medium of my particular form of die construction, will bring about the upsetting of the remaining portion of the shank of the rivet in the hole so that the hole will be completely filled up and the maximum efficiency of the rivet as to the piece of work obtained, regardless of the particular formation of the manufactured head of the rivet in its inception.

Still further I have found that the proper centering of the die relative to the rivet, as to its shank and manufactured head, must of necessity be very accurate in order to insure a proper upsetting of the shank of the rivet and to further the formation of a proper form and shape of head. To this end I have formed the die so that a particular portion or face thereof will, not only insure the application of a line of pressure along the manufactured head and shank to the end that the shank will be upset, but by this flattened portion or face of the die, I am also enabled to positively and accurately center the die as to the head of the rivet to which it is applied, and during the operation of securing the rivet in proper relation to the piece of work, the centering of the die as to the rivet is maintained. Of course in connection with what are known as steeple-head rivets, I may find it applicable to provide additional centering means, the latter however, being merely the further application of my invention to the work to be accomplished, in order to effect the desired result.

In the further disclosure of the invention, reference is to be had to the accompanying drawings, constituting a part of this specification, in which similar characters of reference denote corresponding parts in all the views, and in which, Figure 1 is a sectional view taken through a piece of work with an applied rivet shown in elevation, showing the application of my form of die to the manufactured head end of a rivet, prior to the application of the necessary pressure or hammer blow, for the driving home of the rivet, and its ultimate form into the finished product.

Fig. 2 is a view like Fig. 1, in this instance however, showing the form of the manufactured steeple-head of the rivet after it has been operated upon by my particular die.

Fig. 3 is a diagrammatic view illustrating the application of the die, to the manufactured head end of a steeple-head rivet.

Fig. 4 is a fragmentary sectional view of the die as applied to the conical-head rivet, a portion of the latter being shown in elevation, and Fig. 5 is a fragmentary sectional view of the same showing the manner of applying same to a button-head rivet, the latter being partially shown in elevation.

In the views, the numeral 10 indicates a piece of work, and which may consist of abutting boiler or other plates 11, which are adapted to be securely held together by a rivet 12, it being understood that the rivet as applied to the piece of work, is formed at one end with a head 13, known as the manufactured head of the rivet and includes an integral shank or stem 14, one end of which projects beyond the usual opening 15 in the piece of work, and which projecting end is later to be formed into a complete head 16, similar to the manufactured head on the other end of the rivet. In my invention I make use of a die 17, applied to the manufactured head of the rivet, the other or projecting shank or stem being subjected to the action of a pressure or hammer blow, by the use of the usual riveting machine which also carries a die or head forming member 18.

It may be here stated that my particular form of die can be applied successfully to either the manufactured head end of a rivet or to the shank which is to be formed into a head, but inasmuch as a partial upsetting of the shank of the rivet is accomplished in the use of the usual head-forming member or tool now generally employed, I shall for the purpose of simplicity, dwell more particularly upon the use of my form of die to the manufactured head end of the rivet and therefore in contra-distinction to the head forming die or member 18, and the usual form and construction of head forming member, for the manufactured end of a rivet, I shall call my particular form of construction the die for the manufactured head end of the rivet.

It is of course to be understood that in the application of a head-forming member or die to a rivet, the shank that is to be formed into a head is operated upon by the head-forming member which is subjected to a hammer blow or pressure, produced in most cases by the action of the usual riveting machine, whereas the die applied to the manufactured end of the rivet is bucked-up by what is generally known as an air cushion bucker and for this reason the manufactured end of the rivet is commonly termed the bucked-up side or end.

My particular form of die 17 is formed at its operating end with a depression or recess 19 providing an inclined surface of a circular nature, the inclination of which is preferably forty-five degrees to the longitudinal plane of the die, or in other words, the said inclined surface is formed with an angularity parallel to the angularity of the manufactured head end of a rivet in cases where a steeple head or conical rivet is employed and this inclined surface in this instance is indicated by the numeral 20, it being understood that the surface 20 may be also formed on an arc and of a curved nature for the accommodation of the usual button-head rivet clearly shown in Fig. 5. At the inner terminus or extremity of the mentioned surface 20, there is formed a substantially flat portion or surface 21, and in the case of a steeple-head rivet this substantially flat portion or surface 21 may be formed with a central depression 22. Now by careful reference to Fig. 3 and also to other of the figures shown in the drawings, it will be seen that the border or edge of the substantially flat portion or surface 21, lies in the longitudinal line of direction of the shank or stem of the rivet which is to be operated upon or in other words is traversed by an imaginary line drawn from the edge or border of this surface, along the shank of the rivet and adjacent thereto, through that portion of the rivet opening which has not yet been filled up by the upsetting of the shank of the rivet after it is operated upon. Attention is called to the fact that this mathematical degree of construction is necessarily followed at all times, regardless of the particular formation of construction of the head of the rivet to be operated upon, as clearly shown for instance in Figs. 4, 5.

By having this substantially flattened portion or surface mathematically designed in relation to the diameter of the shank of the rivet or the diameter of the hole into which the rivet is placed, it must of necessity follow that the pressure subsequently directed against the ends of the rivet or either end thereof, will bring about a line of pressure which instead of causing the metal of the head to be pressed out between the forward edge of the die and the face of the piece of work, will displace a portion of the metal of the head and direct it along the shank of the rivet, upsetting the latter to fill the hole into which the rivet has been placed, so that when the particular form of die is applied to the manufactured head of the rivet with the usual head forming implements simultaneously applied to the other or shank end of the rivet, the application of the necessary pressure or hammer blow, will bring about the complete upsetting of the rivet shank in the hole of the piece of work.

Applying now my particular form of die to the manufactured head end of a rivet, it will be apparent that in order to further the successful operation to bring about the complete upsetting of the rivet, the operation applicable in proceeding with the work, consists in placing the heated rivet in the hole of the part to be riveted, operating upon the shank end of the rivet to form a new head and thereby also upset a portion of the shank on that end of the rivet to fill a portion of the hole and simultaneously exert against the opposite end or manufactured head of the rivet, also known as the bucked-up side thereof, a pressure projecting longitudinally along a line of direction in the plane of the space between the rivet and the border wall of the hole thereof, or along the periphery of the shank of the rivet so as to effect the upsetting of the remaining portion of the shank and completely fill up the hole up to the manufactured head of the rivet.

From the foregoing description, it will be seen that the herein described operation comprehends therefore, a particular mode or manner of application of a die to the end of a rivet to accomplish a displacement of metal in such a manner that the shank of the rivet will be upset in the hole and that in the use of a particular form of die such as described, the centering of the rivet is an important factor in the accomplishment of the desired result.

Having described my invention, I claim—

1. A die for setting a rivet in the rivet hole of a piece of work comprising a pressure applying head formed with a working surface whose greatest transverse distance is greater than the diameter of the shank of the rivet and less than the diameter of the rivet hole.

2. A die for setting a rivet in the rivet hole of a piece of work comprising a pressure applying head having a depression formed with a working surface whose diameter is greater than the diameter of the shank of the rivet and less than the diameter of the rivet hole.

3. A die for setting a rivet in the rivet hole of a piece of work comprising a pressure applying head having a depression providing a plurality of surfaces, one of which is of a diameter greater than the diameter of the shank of the rivet and less than the diameter of the rivet hole.

In testimony whereof I affix my signature.

CHARLES F. LENHART.